John W. Doud. Cultivator.

No. 73173

PATENTED JAN 7 1868

Witnesses:
Alex F. Roberts
A R Cork

Inventor:
John W. Doud
per Munn & Co
Attorneys

United States Patent Office.

JOHN W. DOUD, OF FORESTVILLE, IOWA.

Letters Patent No. 73,173, dated January 7, 1868.

---

IMPROVEMENT IN CULTIVATORS.

---

The Schedule referred to in these Letters Patent and making part of the same.

---

TO ALL WHOM IT MAY CONCERN:

Be it known that I, JOHN W. DOUD, of Forestville, in the county of Delaware, and State of Iowa, have invented a new and useful Improvement in Cultivators; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish a simple, substantial, durable, and cheap cultivator for putting in all kinds of grain sown broadcast, and for preparing the ground for winter-wheat, which shall be so constructed as to economize time, labor, and seed in putting in the grain, the machine destroying the weeds and covering the grain uniformly, so that it can all come up; and it consists in the construction, combination, and arrangement of the various parts, as hereinafter more fully described.

Figure 1:
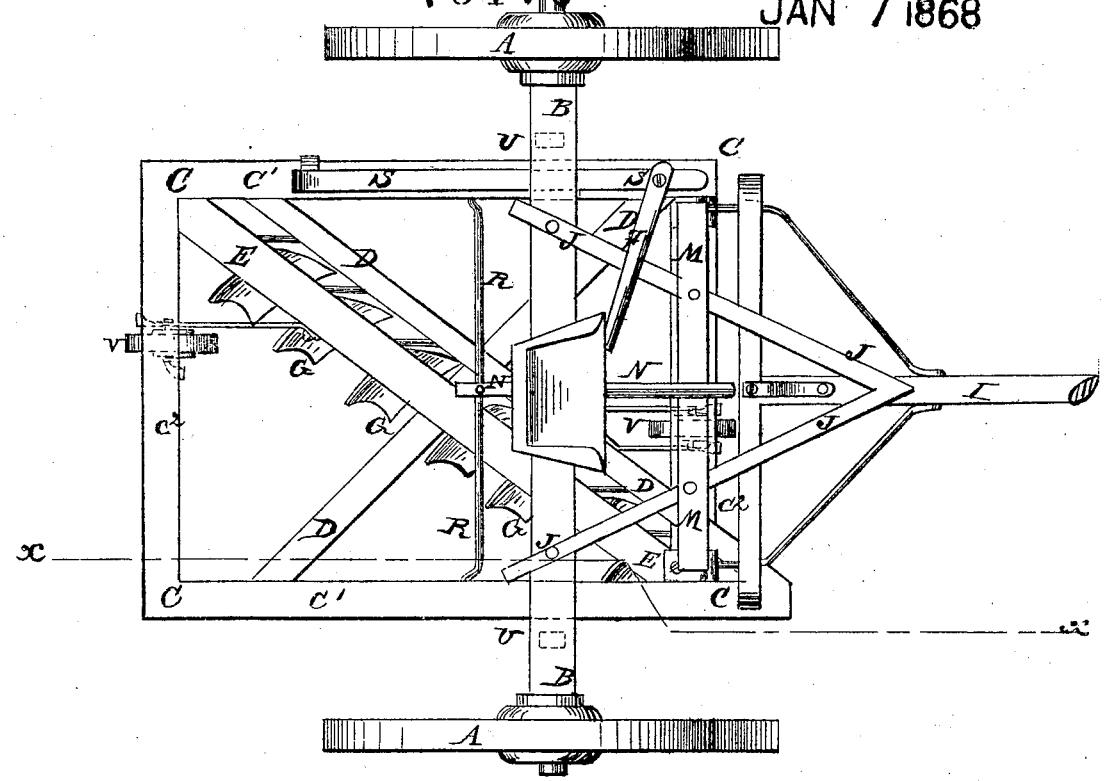
Figure 1 is a top view of my improved cultivator.
Figure 2:
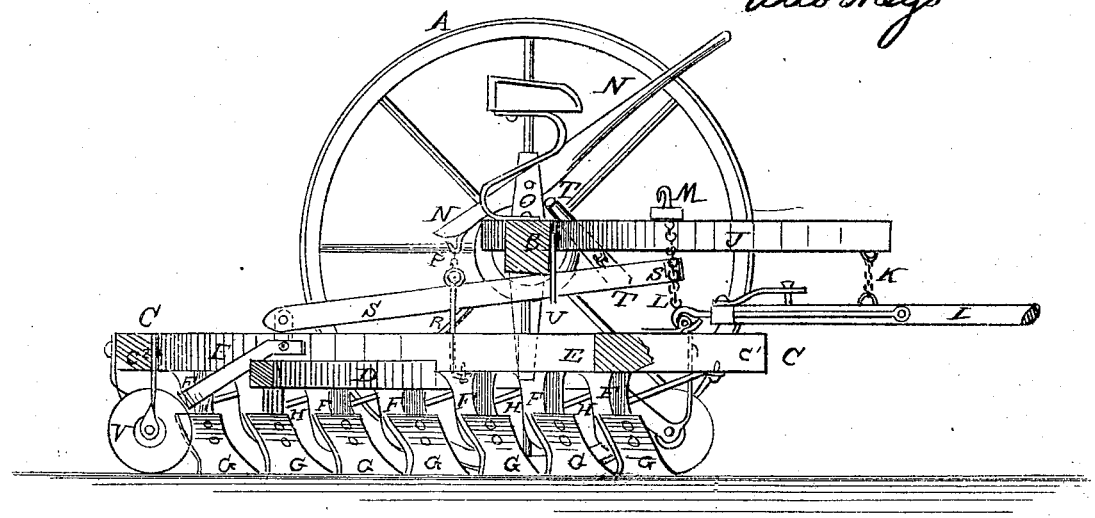
Figure 2 is a side view of the same, partly in section, through the line $x\,x$, fig. 1.

A are wheels, and B is the axle, with which the other parts of the cultivator are connected in the manner hereinafter described. C is the frame of the cultivator, consisting of two side bars, $c^1$, and two end bars, $c^2$, securely framed to each other. The frame C is strengthened by X-shaped braces, D, as shown in fig. 1. E is a beam, crossing the frame $e$ diagonally from corner to corner, and securely attached to the said frame. F are the plough-standards, to the lower ends of which the shovels or ploughs G are attached, and the upper ends of which are attached to the diagonal beam E. The standards F are strengthened by brace-rods, H, running from the lower parts of said standards to the brace-bar D that runs parallel with the said beam E. The number of standards and ploughs used should vary with the size of the cultivator. I is the tongue, which is attached to the forward end of the frame C. To the axle B are attached two inclined bars, J, meeting each other at an angle over the rear part of the tongue I, with which they are connected with a jointed or link connection, K, as shown in fig. 2. L are chains, the lower ends of which are attached to the forward corners of the frame C, and the upper ends of which are hooked upon hooks attached to the ends of the cross-bar M, secured to the inclined bars J. N is a lever, pivoted to supports O, attached to the central part of the axle B, and to the rear end of which is attached a hook, upon which hooks a short chain, P, the lower end of which is attached to the central part of the bail or bar R, the ends of which are attached to the side bars of the frame C, so that by lowering the forward end of the lever N, the ploughs may be raised from the ground for convenience in turning or in passing over obstructions. S is a lever, the rear end of which is pivoted to the side bar $c^1$ of the frame C, which passes through a keeper attached to the axle B, and to the forward end of which is pivoted one end of the lever T, which is pivoted to one of the inclined bars J, and its other end extends inward into such a position as to be easily reached and operated by the driver from his seat.

By depressing the inner end of the lever T, the rear end of the lever S will be depressed so as to bear down upon the frame C, and force the ploughs farther into the ground. The levers S and T are only necessary when using the machine upon hard ground. By shortening the chains L and P, the frame C may be suspended close to the axle B, so that the machine may be conveniently moved any desired distance.

U are downwardly-projecting arms, attached to the axle B, upon each side of the frame C, to limit the side movements of said frame. V are adjustable gauge-wheels, attached to the front and rear ends of the frame C, to regulate the depth at which the ploughs run in the ground.

I claim as new, and desire to secure by Letters Patent—

1. The combination of the frame C, strengthening-braces D, and diagonal plough-beam E, to which the standards F of the ploughs G are attached, with each other, the said parts being constructed and arranged substantially as herein shown and described, and for the purpose set forth.

2. Connecting the axle B to the tongue I of the frame C by the inclined bars J, and jointed or link connection K, substantially as herein shown and described.

3. The combination of the cross-bar M and adjustable chains L with the inclined bars J and frame C, substantially as herein shown and described, and for the purpose set forth.

4. The combination of the lever N, chain P, and bail or bar R with the frame C and axle B, substantially as herein shown and described, and for the purpose set forth.

5. The combination of the levers S and T with the frame C, axle B, and inclined bar J, substantially as herein shown and described, and for the purpose set forth.

JOHN W. DOUD.

Witnesses:
WM. QUICK,
S. H. SMITH.